US008817155B2

(12) United States Patent
Misu et al.

(10) Patent No.: US 8,817,155 B2
(45) Date of Patent: Aug. 26, 2014

(54) DRIVING DEVICE FOR SOLID-STATE IMAGE PICKUP DEVICE CAPABLE OF SELECTING PARALLEL NUMBER OF FETS (71) Applicant: NEC TOSHIBA Space Systems, Ltd., Tokyo (JP)

(72) Inventors: Hiroyuki Misu, Tokyo (JP); Hirokazu Ikeda, Kanagawa (JP)

(73) Assignee: NEC TOSHIBA Space Systems, Ltd., Tokyo (JP)

( * ) Notice: Subject to any disclaimer, the term of this patent is extended or adjusted under 35 U.S.C. 154(b) by 58 days.

(21) Appl. No.: 13/727,244

(22) Filed: Dec. 26, 2012

(65) Prior Publication Data
US 2013/0175432 A1 Jul. 11, 2013

(30) Foreign Application Priority Data

Jan. 11, 2012 (JP) ................................ 2012-003310

(51) Int. Cl.
H04N 5/335 (2011.01)
(52) U.S. Cl.
USPC .......................................... 348/312; 348/308
(58) Field of Classification Search
USPC .................................................. 348/312, 308
See application file for complete search history.

(56) References Cited

U.S. PATENT DOCUMENTS 5,449,940 A * 9/1995 Hirata .......................... 257/360
6,151,186 A * 11/2000 O'Farrell .................. 360/78.04

| 2001/0005148 | A1* | 6/2001 | Takano et al. ................. 326/112 |
|---|---|---|---|
| 2004/0056851 | A1 | 3/2004 | Lawler et al. |
| 2004/0183920 | A1 | 9/2004 | Tanimoto |
| 2010/0177230 | A1 | 7/2010 | Himeno et al. |

FOREIGN PATENT DOCUMENTS

| JP | 2000295536 A | 10/2000 |
|---|---|---|
| JP | 2002-027333 A | 1/2002 |
| JP | 2004-248003 A | 9/2004 |
| JP | 2006-108757 A | 4/2006 |
| JP | 2007-336300 A | 12/2007 |
| WO | 2008018363 A1 | 2/2008 |

OTHER PUBLICATIONS

Office Action dated Jan. 16, 2014, issued by the Korean Intellectual Property Office in corresponding Korean Application No. 10-2012-0152973.
European Extended Search Report, dated Aug. 5, 2013, issued by the European Patent Office in counterpart European Application No. 12198595.6.

* cited by examiner

*Primary Examiner* — Twyler Haskins
*Assistant Examiner* — Quang Le
(74) *Attorney, Agent, or Firm* — Sughrue Mion, PLLC (57) ABSTRACT

A driving circuit includes first through N-th selective operation driving portions selectively producing first through N-th selective operation driving signals, a selection circuit selectively driving the first through the N-th selective operation driving portions in response to an input signal and a control signal, and a supplying arrangement combining the first through the N-th selective operation driving signals to supply a combined driving signal to a solid-stage image pickup device. An n-th selective operation driving portion includes $(M \times 2^{(n-1)})$ P-channel FETs connected in parallel with each other and $(M \times 2^{(n-1)})$ N-channel FETs connected in parallel with each other. The $(M \times 2^{(n-1)})$ P-channel FETs have drains connected to drains of the $(M \times 2^{(n-1)})$ N-channel FETs.

12 Claims, 6 Drawing Sheets

DRIVING DEVICE FOR SOLID-STATE IMAGE PICKUP DEVICE CAPABLE OF SELECTING PARALLEL NUMBER OF FETS

This application is based upon and claims the benefit of priority from Japanese patent application No. 2012-003310, filed on Jan. 11, 2012, the disclosure of which is incorporated herein in its entirety by reference.

BACKGROUND OF THE INVENTION

1. Field of the Invention

This invention relates to a driving device driving a solid-state image pickup device such as a charge coupled device (CCD) or the like and, more particularly, to a driving device capable of changing a driving capability of the CCD (the solid-state image pickup device).

2. Description of Related Art

Various driving device capable of changing the driving capability of the solid-state image pickup device such as the CCD are already proposed heretofore.

By way of illustration, JP 2002-27333 A (which will later be called Patent Document 1) discloses a "driving device of a solid-state image pickup device" in which an output portion for horizontal CCD driving pulses of a which is configured by connecting to parallel with n (plural) 3-state buffers. In the driving device disclosed in Patent Document 1, a driving capacity of the horizontal CCD driving pulses produced by the output portion is changed by controlling states of respective 3-state buffers by control lines in accordance with a terminal load capacity of the CCD solid-state pickup device, respectively.

Although the states of the 3-state buffers are controlled by the control lines in the driving device disclosed in Patent Document 1, Patent Document 1 never discloses a method of controlling the control lines. In addition, inasmuch as the control lines are directly connected to the respective 3-state buffers in the driving device to control the respective 3-state buffers in the driving device disclosed in Patent Document 1, a lot of control lines are required to control on/off of the respective 3-state buffers.

In addition, JP 2004-248003 A (which will later be called Patent Document 2 and which corresponds to US 2004/0183920 A1) discloses an "image capturing device" including a driving circuit configured with a first inverter, an OR gate, an AND gate, a second inverter, a first transistor, and a second transistor. The first inverter inverts a timing signal supplied from a timing control circuit to supply an inverted timing signal from a first node to a solid-state image pickup device as a driving clock signal. The first transistor comprises a P-channel MOS transistor and is connected between a power supply and a second node. The second transistor comprises an N-channel MOS transistor and is connected between a ground point and a second node. The second inverter inverts a configuration value to produce an inverted configuration value. The OR gate ORs the timing signal and the inverted configuration value to supply an ORed output to a gate of the first transistor. The AND gate ANDs the timing signal ant the inverted configuration value to supply an ANDed output to a gate of the second transistor. Although the driving circuit comprises a circuit in a case of two-stage switching of driving capabilities, the driving capabilities can be switched at a larger number of stages through three or more structures connected in parallel to the first inverter, each including the OR gate, the AND gate, the second inverter, and the first and second transistors.

It is necessary for an image capturing device disclosed in Patent Document 2 to connect the structure including the OR gate, the AND gate, the second inverter, and the first and second transistors in parallel to the first inverter in three or more stages in order to increase the number of selected stages, a component count is increased in accordance with the number of stages. In addition, the configuration values must be set every structure including the OR gate, the AND gate, the second inverter, and the first and second transistors in the image capturing device disclosed in Patent Document 2, a lot of configuration values are required to increase the number of stages.

JP 2006-108757 A (which will later be called Patent Document 3) discloses a "CCD driving circuit" for which cost reduction and shortening of time for design can be realized by commonly using a circuit for a plurality of CCD image sensors having different driving performance. The CCD driving circuit disclosed in Patent Document 3 comprises a driving signal generator for generating a driving signal to be produced to a CCD image sensor, a driving performance information acquiring section for acquiring CCD driving performance information, and a control unit for causing the driving signal generator to generate a driving signal consisting of driving performance corresponding to the driving performance information acquired by the driving performance information acquiring section. The diving signal generator comprises a plurality of driving signal generating circuits each of which comprises a tri-state buffer or the like. The driving signal generating circuits are connected to in parallel with each other. The control unit causes the driving signal generating circuits in the driving signal generator to generate that are equal in number to the number indicated by the driving performance information. Outputs of the driving signal generating circuits driven are collected to supply to the CCD image sensor as a driving signal.

In the CCD driving circuit disclosed in Patent Document 3, turning on/off of the tri-state buffers (the driving signal generating circuits) is carried out by using select signals produced by the control unit. As a results, a lot of select signals are required in the CCD driving circuit disclosed in Patent Document 3 also in order to control the on/off of the respective tri-state buffers (the driving signal generating circuits) in the manner which is similar to a case of the above-mentioned Patent Document 1.

JP 2007-336300 A (which will later be called Patent Document 4) discloses an "imaging apparatus" which is capable of achieving optimization of power consumption. The imaging apparatus disclosed in Patent Document 4 comprises a solid-state imaging element for imaging an optical image of an object as an electrical signal, a timing pulse generation circuit for producing a driving signal for reading the electrical signal to the solid-state imaging element, and a CPU for controlling driving capability (driving current) of the driving signal produced by the timing pulse generation circuit in accordance with an operating state of the imaging apparatus.

In the imaging apparatus disclosed in Patent Document 4, the CPU sets a driving current value (control data) to the timing pulse generation circuit and the timing pulse generation circuit drives the solid-state imaging element at a set driving current value. However, Patent Document 4 never discloses a concrete circuit configuration of the timing pulse generation circuit.

SUMMARY

It is an object of the present invention to provide a driving device of a solid-state image pickup device which is capable of easily changing a parallel number of FETs to be driven in a driving circuit using a small number of control signals.

It is another object of this invention to provide a driving device of a solid-state image pickup device which is capable to arbitrarily changing a parallel number of FETs to be driven in a driving circuit using a small number of control signals with a predetermined number used as one unit.

In one embodiment, there is provided a driving device for a solid-state image pickup device that is a driving device driving the solid-state image pickup device and that includes at least one driving circuit and a control circuit producing a control signal to control the driving circuit. The driving circuit includes first through N-th selective operation driving portions selectively producing first through N-th selective operation driving signals, where N represents an integer which is not less than two, a selection circuit selectively driving the first through N-th selective operation driving portions in response to an input signal and the control signal, and a supplying arrangement combining the first through the N-th selective operation driving signal to supply a combined driving signal to the solid-state image pickup device. An n-th selective operation driving portion includes $(M \times 2^{(n-1)})$ P-channel FETs connected in parallel with each other and $(M \times 2^{(n-1)})$ N-channel FETs connected in parallel with each other, where M represents an integer which is not less than one and n represents each of 1 through N. The $(M \times 2^{(n-1)})$ P-channel FETs have drains connected to drains of the $(M \times 2^{(n-1)})$ N-channel FETs.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF EXEMPLARY EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Now, the description will proceed to a driving device of a solid-state image pickup device according to an exemplary embodiment of this invention in details. Structure and configuration illustrated in the exemplary embodiment of this invention is one example in order to make effects thereof apparent, the structure and the configuration thereof may not be limited to those illustrated before and after this.

First Exemplary Embodiment

Figure 1:
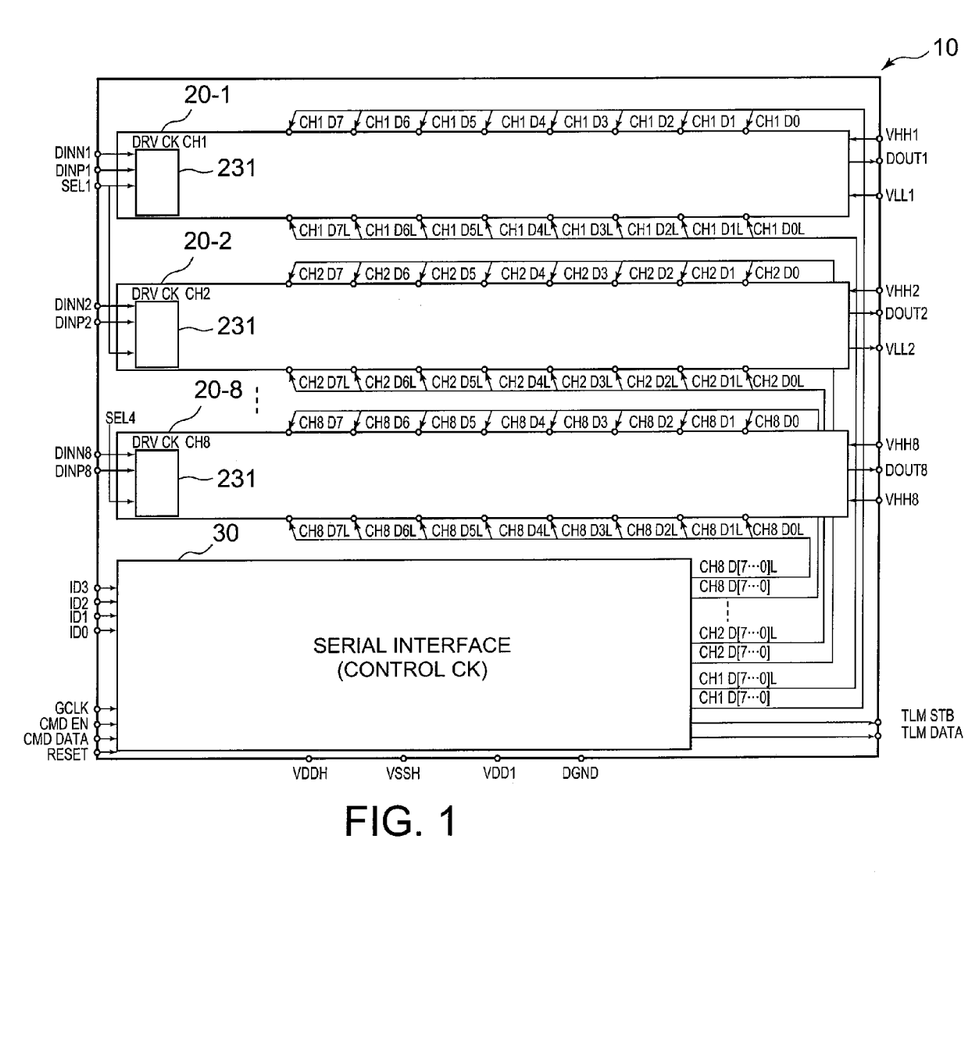
FIG. 1 is a block diagram showing a driving device for a solid-state image pickup device according to a first exemplary embodiment of this invention.

FIG. 1 is a block diagram showing a driving device 10 for a solid-state image pickup device according to a first exemplary embodiment of this invention. Although the solid-state image pickup device comprises a CCD in the example being illustrated, the solid-state image pickup device may not be limited thereto. Hereinafter, the driving device 10 for the solid-state image pickup device will be merely called a "driving device". The driving device 10 is a device for sending driving signals to the CCD (the solid-state image pickup device) which is not shown. Herein, the driving signals comprise ones whose frequencies are slow the order of several Hz and others whose frequencies are fast the order of 16 MHz. The driving device 10 can drive the CCD at the driving signals having all of their frequencies.

The illustrated driving device 10 can vary a driving capability of the driving signals for driving the CCD on the basis of an external command in order to optimize a CCD driving. The driving signals have level which can arbitrarily set by a voltage (a power supply voltage) supplied from the external.

The illustrated driving device 10 comprises first through eighth driving circuits 20-1, 20-2, ..., and 20-8, and a control circuit 30 for controlling the first through the eighth driving circuits 20-1 to 20-8. Although the driving device 10 comprises eight driving circuits 20-1 to 20-8 in the example being illustrated, the driving device 10 may comprise at least one driving circuit.

The example being illustrated shows a case where the driving circuits 20-1 to 20-8 and the control circuit 30 are implemented by an analog application specific integrated circuits (ASIC).

In the manner which will later be described, the driving device 10 can arbitrarily switch or change, using a small number of control signals, parallel number of FETs (CMOS-FETs) to be driven in the driving circuits 20-1 to 20-8 with a predetermined number M used as a unit, where M represents an integer which is not less one. In the example being illustrated, the predetermined number M is set to ten.

In the example being illustrated, the first driving circuit 20-1 is depicted at "DRV circuit CH1", the second driving circuit 20-2 is depicted at "DRV circuit CH2", and the eight driving circuit 20-8 is depicted at "DRV circuit CH8". The first through the eighth driving circuits 20-1 to 20-8 are similar in structure to each other. Accordingly, hereinafter, the description will be made mainly about the first driving circuit 20-1 in details.

Figure 2:
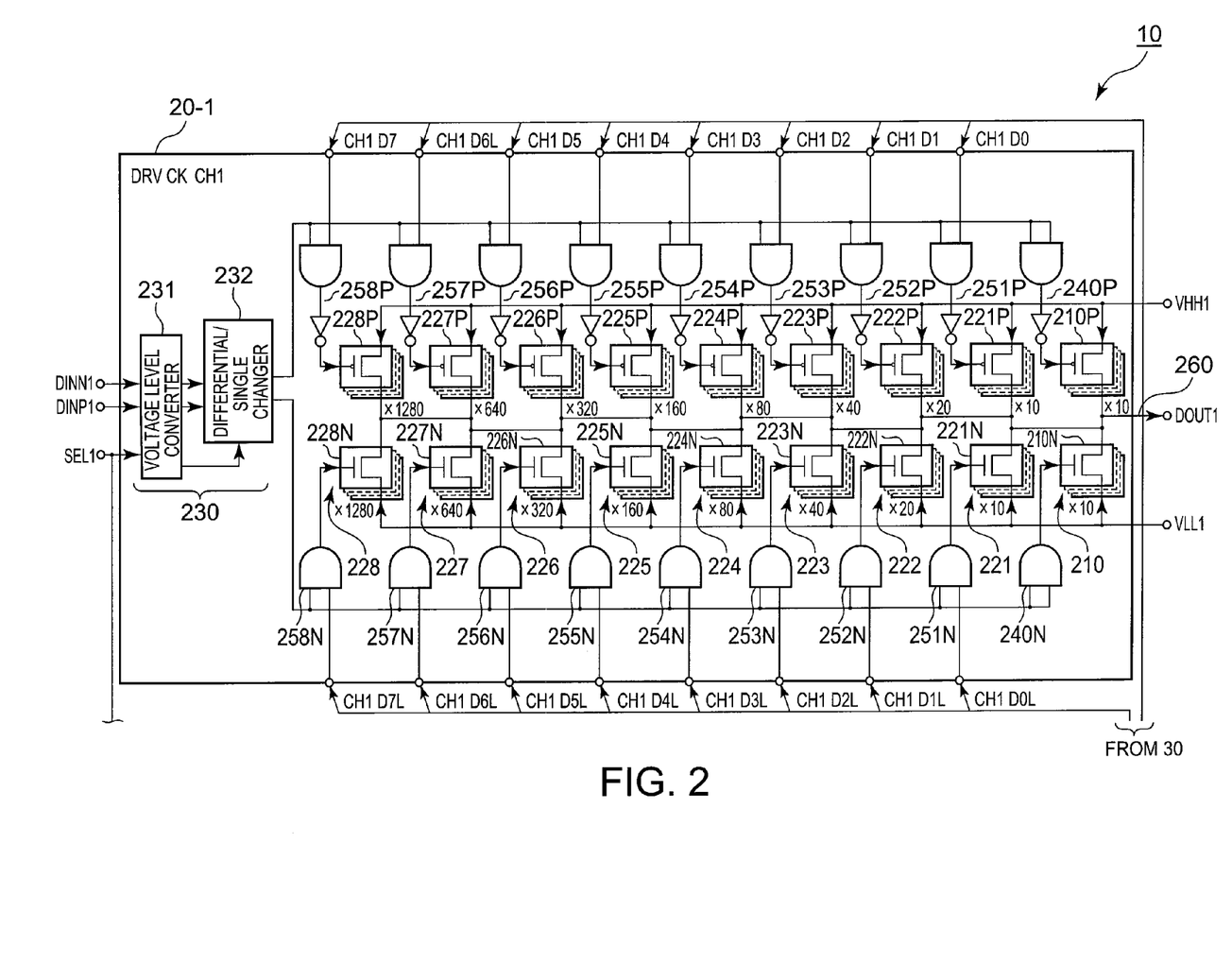
FIG. 2 is a circuit diagram showing a first driving circuit for use in the driving circuit illustrated in FIG. 1.

FIG. 2 is a circuit diagram showing an internal configuration of the first driving circuit 20-1 in details. The first driving circuit 20-1 includes a continuous operation driving portion 210 and first through N-th selective operation driving portions, where N represents an integer which is not less than two. In the example being illustrated, N is equal to eight. Accordingly, the first driving circuit 20-1 includes first through eighth selective operation driving portions 221, 222, 223, 224, 225, 226, 227, and 228.

The continuous operation driving portion 210 comprises 10 P-channel metal oxide semiconductor field effect transistors (MOSFETs) 210P connected in parallel with each other and 10 N-channel MOSFETs 210N connected in parallel with each other. The 10 P-channel MOSFETs 210P have drains which are connected to drains of the 10 N-channel MOSFETs 210N. That is, the continuous operation driving portion 210 comprises 10 complementary MOS (CMOS) FETs. The continuous operation driving portion 210 comprises a circuit for continuously producing a continuous operation driving signal.

The first selective operation driving portion 221 comprises $(10\times2^0)$ P-channel MOSFETs 221P connected in parallel with each other and $(10\times2^0)$ N-channel MOSFETs 221N connected in parallel with each other. The 10 P-channel MOSFETs 221P have drains which are connected to drains of the 10 N-channel MOSFETs 221N. That is, the first selective operation driving portion 221 comprises 10 complementary MOS (CMOS) FETs. The first selective operation driving portion 221 comprises a circuit for selectively producing a first selective operation driving signal in the manner which will later be described.

The second selective operation driving portion 222 comprises $(10\times2^1)$ P-channel MOSFETs 222P connected in parallel with each other and $(10\times2^1)$ N-channel MOSFETs 222N connected in parallel with each other. The 20 P-channel MOSFETs 222P have drains which are connected to drains of the 20 N-channel MOSFETs 222N. That is, the second selective operation driving portion 222 comprises 20 complementary MOS (CMOS) FETs. The second selective operation driving portion 222 comprises a circuit for selectively producing a second selective operation driving signal in the manner which will later be described.

The third selective operation driving portion 223 comprises $(10\times2^2)$ P-channel MOSFETs 223P connected in parallel with each other and $(10\times2^2)$ N-channel MOSFETs 223N connected in parallel with each other. The 40 P-channel MOSFETs 223P have drains which are connected to drains of the 40 N-channel MOSFETs 223N. That is, the third selective operation driving portion 223 comprises 40 complementary MOS (CMOS) FETs. The third selective operation driving portion 223 comprises a circuit for selectively producing a third selective operation driving signal in the manner which will later be described.

The fourth selective operation driving portion 224 comprises $(10\times2^3)$ P-channel MOSFETs 224P connected in parallel with each other and $(10\times2^3)$ N-channel MOSFETs 224N connected in parallel with each other. The 80 P-channel MOSFETs 224P have drains which are connected to drains of the 80 N-channel MOSFETs 224N. That is, the fourth selective operation driving portion 224 comprises 80 complementary MOS (CMOS) FETs. The fourth selective operation driving portion 224 comprises a circuit for selectively producing a fourth selective operation driving signal in the manner which will later be described.

The fifth selective operation driving portion 225 comprises $(10\times2^4)$ P-channel MOSFETs 225P connected in parallel with each other and $(10\times2^4)$ N-channel MOSFETs 225N connected in parallel with each other. The 160 P-channel MOSFETs 225P have drains which are connected to drains of the 160 N-channel MOSFETs 225N. That is, the fifth selective operation driving portion 225 comprises 160 complementary MOS (CMOS) FETs. The fifth selective operation driving portion 225 comprises a circuit for selectively producing a fifth selective operation driving signal in the manner which will later be described.

The sixth selective operation driving portion 226 comprises $(10\times2^5)$ P-channel MOSFETs 226P connected in parallel with each other and $(10\times2^5)$ N-channel MOSFETs 226N connected in parallel with each other. The 320 P-channel MOSFETs 226P have drains which are connected to drains of the 320 N-channel MOSFETs 226N. That is, the sixth selective operation driving portion 226 comprises 320 complementary MOS (CMOS) FETs. The sixth selective operation driving portion 226 comprises a circuit for selectively producing a sixth selective operation driving signal in the manner which will later be described.

The seventh selective operation driving portion 227 comprises $(10\times2^6)$ P-channel MOSFETs 227P connected in parallel with each other and $(10\times2^6)$ N-channel MOSFETs 227N connected in parallel with each other. The 640 P-channel MOSFETs 227P have drains which are connected to drains of the 640 N-channel MOSFETs 227N. That is, the seventh selective operation driving portion 227 comprises 640 complementary MOS (CMOS) FETs. The seventh selective operation driving portion 227 comprises a circuit for selectively producing a seventh selective operation driving signal in the manner which will later be described.

The eighth selective operation driving portion 228 comprises $(10\times2^7)$ P-channel MOSFETs 228P connected in parallel with each other and $(10\times2^7)$ N-channel MOSFETs 228N connected in parallel with each other. The 1280 P-channel MOSFETs 228P have drains which are connected to drains of the 1280 N-channel MOSFETs 228N. That is, the eighth selective operation driving portion 228 comprises 1280 complementary MOS (CMOS) FETs. The eighth selective operation driving portion 228 comprises a circuit for selectively producing an eighth selective operation driving signal in the manner which will later be described.

Referring to FIG. 1 in addition to FIG. 2, the control circuit 30 comprises a command decoder (a serial interface) for producing as the control signal, in response to the external command, first through eighth selection signals for selectively operating the first through the eighth selective operation driving portions 221 to 228, respectively.

In the illustrated driving device 10, the first driving circuit 20-1 receives, as a first input signal, a pair of opposite phase input signals DINN1 and DINP1 having opposite phases with each other. Likewise, the second driving circuit 20-2 receives, as a second input signal, a pair of opposite phase input signals DINN2 and DINP2 having opposite phases with each other. The eighth driving circuit 20-8 receives, as an eighth input signal, a pair of opposite phase input signals DINN8 and DINP8 having opposite phases with each other. In general, an i-th driving circuit 20-i receives, as an i-th input signal, a pair of opposite phase input signals DINNi and DINPi having opposite phases with each other, where i represents each of 1 through 8.

In the first driving circuit 20-1, the respective P-channel MOSFETs, which constitute the continuous operation driving portion 210 and the first through the eighth selective operation driving portions 221 to 228, have sources supplied with a first power supply voltage VHH1. In addition, the respective N-channel MOSFETs, which constitute the continuous operation driving portion 210 and the first through the eighth selective operation driving portions 211 to 218, have sources supplied with a second power supply voltage VLL1 lower than the first power supply voltage VHH1.

As a result of this, a level of the first driving signal produced by the first driving circuit 20-1 can be arbitrarily set by means of the first and the second power supply voltages VHH1 and VHH1 which are supplied from the external.

Similarly, in the second driving circuit 20-2, respective P-channel MOSFETs, which constitute a normally operation driving portion and first through eighth selective operation driving portions, have sources supplied with a first power supply voltage VHH2. In addition, respective N-channel MOSFETs, which constitute a continuous operation driving portion and first through eighth selective operation driving portions, have sources supplied with a second power supply voltage VLL2 lower than the first power supply voltage VHH2.

In the eighth driving circuit 20-8, respective P-channel MOSFETs, which constitute a normally operation driving portion and first through eighth selective operation driving portions, have sources supplied with a first power supply voltage VHH8. In addition, respective N-channel MOSFETs, which constitute a continuous operation driving portion and first through eighth selective operation driving portions, have sources supplied with a second power supply voltage VLL8 lower than the first power supply voltage VHH8.

In general, in the i-th driving circuit 20-i, respective P-channel MOSFETs, which constitute a continuous operation driving portion and first through eighth selective operation driving portions, have sources supplied with a first power supply voltage VHHi. In addition, respective N-channel MOSFETs, which constitute a continuous operation driving portion and first through eighth selective operation driving portions, have sources supplied with a second power supply voltage VLLi lower than the first power supply voltage VHHi.

As shown in FIG. 2, the first driving circuit 20-1 includes a voltage level converter 231 and a differential/single changer 232. The voltage level converter 231 is supplied with the pair of opposite phase input signals DINN1 and DINP1 and a first selection signal SEL1. The voltage level converter 231 converts voltage levels of the pair of opposite phase input signals DINN1 and DINP1 to produce converted voltage levels. The differential/single changer 232 carries out, in response to the first selection signal SEL1, changing between "differential" and "single driving" with respect to the converted voltage levels produced by the voltage level converter 231.

More specifically, when the first selection signal SEL1 indicates "differential", the voltage level converter 231 is supplied with, as a driving input signal, the pair of opposite phase input signals DINN1 and DINP1. On the other hand, when the selection signal SEL1 indicates "single driving" by setting the first selection signal SEL1 to a logic "H" level or a logic "L" level, the voltage level converter 231 is supplied with, as the driving input signal, only one input signal DINP1, and it is therefore possible to use the voltage level converter 231 with another input signal DINN1 put into a state of open.

At any rate, a combination of the voltage level converter 231 and the differential/single changer 232 is operable as a logic level generation circuit 230 for generating first and second logic input signals having inverted logic levels with each other on the basis of the pair of opposite phase input signals DINN1 and DINP1.

The first driving circuit 20-1 further comprises a continuous operation NAND gate 240P and a normally operation AND gate 240N. The continuous operation NAND gate 240P NANDs between the first logic input signals to supply a continuous operation NANDed result to gates of the 10 P-channel MOSFETs 210P. The continuous operation AND gate 240N ANDs between the second logic input signals to supply a continuous operation ANDed result to the 10 N-channel MOSTFETs 210N. Accordingly, a combination of the continuous operation NAND gate 240P and the continuous operation AND gate 240N serves as an operation circuit for supplying, in response to the first and the second logic input signals, the continuous operation driving portion 210 with a signal which continuously operates the continuous operation driving portion 210. In other words, the operation circuit is a circuit for continuously operating the continuous operation driving portion 210 in response to an input signal (DINN1, DINP1).

As shown in FIG. 1, the command decoder (the serial interface) 30 supplies the first driving circuit 20-1 with, as first through eighth selection signals, first through eighth positive selection signals CH1D0, CH1D1, CH1D2, CH1D3, CH1D4, CH1D5, CH1D6, and CH1D7 and first through eighth negative selection signals CH1D0L, CH1D1L, CH1D2L, CH1D3L, CH1D4L, CH1D5L, CH1D6L, and CH1D7L in order to select the first through the eighth selective operation driving portions 211 to 228, respectively.

Likewise, the command decoder (the serial interface) 30 supplies the second driving circuit 20-2 with, as first through eighth selection signals, first through eighth positive selection signals CH2D0, CH2D1, CH2D2, CH2D3, CH2D4, CH2D5, CH2D6, and CH2D7 and first through eighth negative selection signals CH2D0L, CH2D1L, CH2D2L, CH2D3L, CH2D4L, CH2D5L, CH2D6L, and CH2D7L in order to select the first through the eighth selective operation driving portions, respectively.

The command decoder (the serial interface) 30 supplies the eighth driving circuit 20-8 with, as first through eighth selection signals, first through eighth positive selection signals CH8D0, CH8D1, CH8D2, CH8D3, CH8D4, CH8D5, CH8D6, and CH8D7 and first through eighth negative selection signals CH8D0L, CH8D1L, CH8D2L, CH8D3L, CH8D4L, CH8D5L, CH8D6L, and CH8D7L in order to select the first through the eighth selective operation driving portions, respectively.

In general, the command decoder (the serial interface) 30 supplies the i-th driving circuit 20-i with, as first through eighth selection signals, first through eighth positive selection signals CHiD0, CHiD1, CHiD2, CHiD3, CHiD4, CHiD5, CHiD6, and CHiD7 and first through eighth negative selection signals CHiD0L, CHiD1L, CHiD2L, CHiD3L, CHiD4L, CHiD5L, CHiD6L, and CHiD7L in order to select the first through the eighth selective operation driving portions, respectively.

As shown in FIG. 2, the first driving circuit 20-1 further comprises first through eighth selective operation NAND gates 251P, 252P, 253P, 254P, 255P, 256P, 257P, and 268P and first through eighth selective operation AND gates 251N, 252N, 253N, 254N, 255N, 256N, 257N, and 258N.

The first selective operation NAND gate 251P NANDs the first logic input signal and the first positive selection signal CH1D0 to supply a first selective operation NANDed result to the 10 P-channel MOSFETs 221P. The first selective operation AND gate 251N ANDs the second logic input signal and the first negative selection signal CH1D0L to supply a first selective operation ANDed result to the 10 N-channel MOSFETs 221N. Accordingly, a combination of the first selective operation NAND gate 251P and the first selective operation AND gate 251N acts as a first selection circuit portion for selectively driving the first selective operation driving portion 221 in response to the first selection signal (CH1D0, CH1D0L).

The second selective operation NAND gate 252P NANDs the first logic input signal and the second positive selection signal CH1D1 to supply a second selective operation NANDed result to the 20 P-channel MOSFETs 222P. The second selective operation AND gate 252N ANDs the second logic input signal and the second negative selection signal CH1D1L to supply a second selective operation ANDed result to the 20 N-channel MOSFETs 222N. Accordingly, a combination of the second selective operation NAND gate 252P and the second selective operation AND gate 252N acts as a second selection circuit portion for selectively driving the second selective operation driving portion 222 in response to the second selection signal (CH1D1, CH1D1L).

The third selective operation NAND gate 253P NANDs the first logic input signal and the third positive selection signal CH1D2 to supply a third selective operation NANDed result to the 40 P-channel MOSFETs 223P. The third selective operation AND gate 253N ANDs the second logic input signal and the third negative selection signal CH1D2L to supply a third selective operation ANDed result to the 40 N-channel MOSFETs 223N. Accordingly, a combination of the third selective operation NAND gate 253P and the third selective operation AND gate 253N acts as a third selection circuit portion for selectively driving the third selective operation driving portion 223 in response to the third selection signal (CH1D2, CH1D2L).

The fourth selective operation NAND gate 254P NANDs the first logic input signal and the fourth positive selection signal CH1D3 to supply a fourth selective operation NANDed result to the 80 P-channel MOSFETs 224P. The fourth selective operation AND gate 254N ANDs the second logic input signal and the fourth negative selection signal CH1D3L to supply a fourth selective operation ANDed result to the 80 N-channel MOSFETs 224N. Accordingly, a combination of the fourth selective operation NAND gate 254P and the fourth selective operation AND gate 254N acts as a fourth selection circuit portion for selectively driving the fourth selective operation driving portion 224 in response to the fourth selection signal (CH1D3, CH1D3L).

The fifth selective operation NAND gate 255P NANDs the first logic input signal and the fifth positive selection signal CH1D4 to supply a fifth selective operation NANDed result to the 160 P-channel MOSFETs 225P. The fifth selective operation AND gate 255N ANDs the second logic input signal and the fifth negative selection signal CH1D4L to supply a fifth selective operation ANDed result to the 160 N-channel MOSFETs 225N. Accordingly, a combination of the fifth selective operation NAND gate 255P and the fifth selective operation AND gate 255N acts as a fifth selection circuit portion for selectively driving the fifth selective operation driving portion 225 in response to the fifth selection signal (CH1D4, CH1D4L).

The sixth selective operation NAND gate 256P NANDs the first logic input signal and the sixth positive selection signal CH1D5 to supply a sixth selective operation NANDed result to the 320 P-channel MOSFETs 226P. The sixth selective operation AND gate 256N ANDs the second logic input signal and the sixth negative selection signal CH1D2L to supply a third selective operation ANDed result to the 320 N-channel MOSFETs 226N. Accordingly, a combination of the sixth selective operation NAND gate 256P and the sixth selective operation AND gate 256N acts as a sixth selection circuit portion for selectively driving the sixth selective operation driving portion 226 in response to the sixth selection signal (CH1D5, CH1D5L).

The seventh selective operation NAND gate 257P NANDs the first logic input signal and the seventh positive selection signal CH1D6 to supply a seventh selective operation NANDed result to the 640 P-channel MOSFETs 227P. The seventh selective operation AND gate 257N ANDs the second logic input signal and the seventh negative selection signal CH1D6L to supply a seventh selective operation ANDed result to the 640 N-channel MOSFETs 227N. Accordingly, a combination of the seventh selective operation NAND gate 257P and the seventh selective operation AND gate 257N acts as a seventh selection circuit portion for selectively driving the seventh selective operation driving portion 227 in response to the seventh selection signal (CH1D6, CH1D6L).

The eighth selective operation NAND gate 258P NANDs the first logic input signal and the eighth positive selection signal CH1D7 to supply an eighth selective operation NANDed result to the 1280 P-channel MOSFETs 228P. The eighth selective operation AND gate 258N ANDs the second logic input signal and the eighth negative selection signal CH1D7L to supply an eighth selective operation ANDed result to the 1280 N-channel MOSFETs 228N. Accordingly, a combination of the eighth selective operation NAND gate 258P and the eighth selective operation AND gate 258N acts as an eighth selection circuit portion for selectively driving the eighth selective operation driving portion 228 in response to the eighth selection signal (CH1D7, CH1D7L).

At any rate, a combination of the first through the eighth selection circuit portions serves as a selection circuit for selectively driving the first through the eighth selective operation driving portions 221 to 228 in response to the input signal and the control signal.

As shown in FIG. 2, in the first driving circuit 20-1, output terminals of the continuous operation driving portion 210 (i.e. drains of the 10 CMOSFETs) and output terminals of the first through the eighth selective operation driving portions 221 to 228 (i.e. drains of $(10 \times 2^{(n-1)})$ CMOSFETs) are connected to each other by a signal line 260. Accordingly, the signal line 260 serves as a supplying arrangement for combining the continuous operation driving signal and the first through the eighth selective operation driving signals to supply a combined first driving signal DOUT1 to the solid-state image pickup device (the CCD).

Likewise, the second driving circuit 20-2 supplies a combined second driving signal DOUT2 to the solid-state image pickup device (the CCD), and the eighth driving circuit 20-8 supplies a combined eighth driving signal DOUT8 to the solid-state image pickup device (the CCD). In general, the i-th driving circuit 20-$i$ supplies a combined i-th driving signal DOUTi to the solid-state image pickup device (the CCD).

Figure 3:
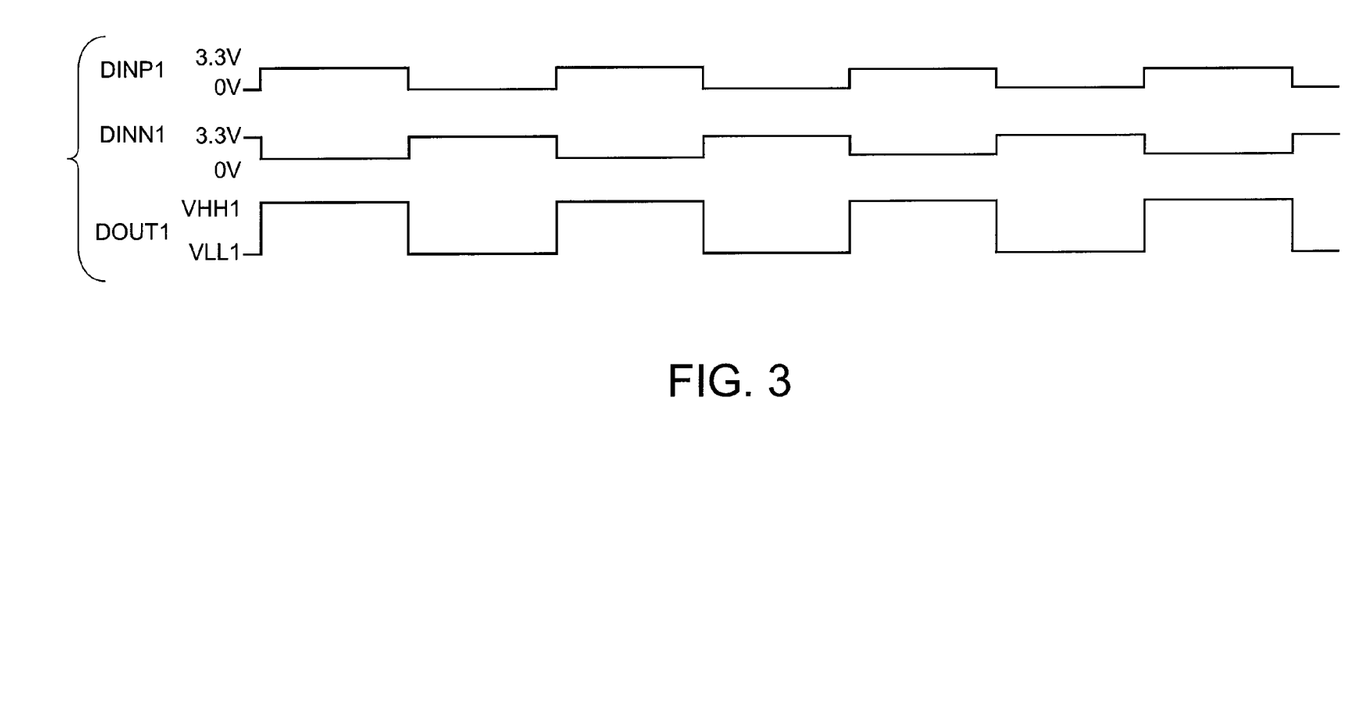
FIG. 3 is a waveform view showing signals which are input/output in the first driving circuit illustrated in FIG. 2.

FIG. 3 is a waveform view showing signals which are input/output in the first driving circuit 20-1 in the driving device 10.

The first driving circuit 20-1 is supplied with, as the first input signal, the pair of opposite phase input signals DINP1 and DINN1 having the opposite phases with each other in the manner depicted along first and second lines in FIG. 3, respectively. In the example being illustrated, each of the pair of opposite phase input signals DINP1 and DINN1 changes between 0 volts and 3.3 volts.

The first driving circuit 20-1 produces the combined first driving signal DOUT1 in the manner depicted along a third line in FIG. 3. In the manner which is described above, the first driving circuit 20-1 is supplied with, as the power supply voltages, the first power supply voltage VHH1 and the second power supply voltage VLL1. Accordingly, the combined first diving signal DOUT1 comprises a signal having amplitude which is equal to a difference between the second power supply voltage VLL1 and the first power supply voltage VHH1.

Turning back to FIG. 1, the control circuit (the command decoder) 30 is supplied with a serial command CMD DATA which is driving capability configuration data as the external command, a data length signal CMD EN indicative of a data length of the serial command, a clock signal GCLK which is a timing signal on reading data and on outputting telemetry data, and a reset signal RESET.

The control circuit (the command decoder) 30 produces a telemetry strobe signal TLM STB which is produced when the serial command CMD DATA normally operates, and telemetry data TLM DATA which is a conforming signal when the serial command of one input is normally read out.

Figure 4:
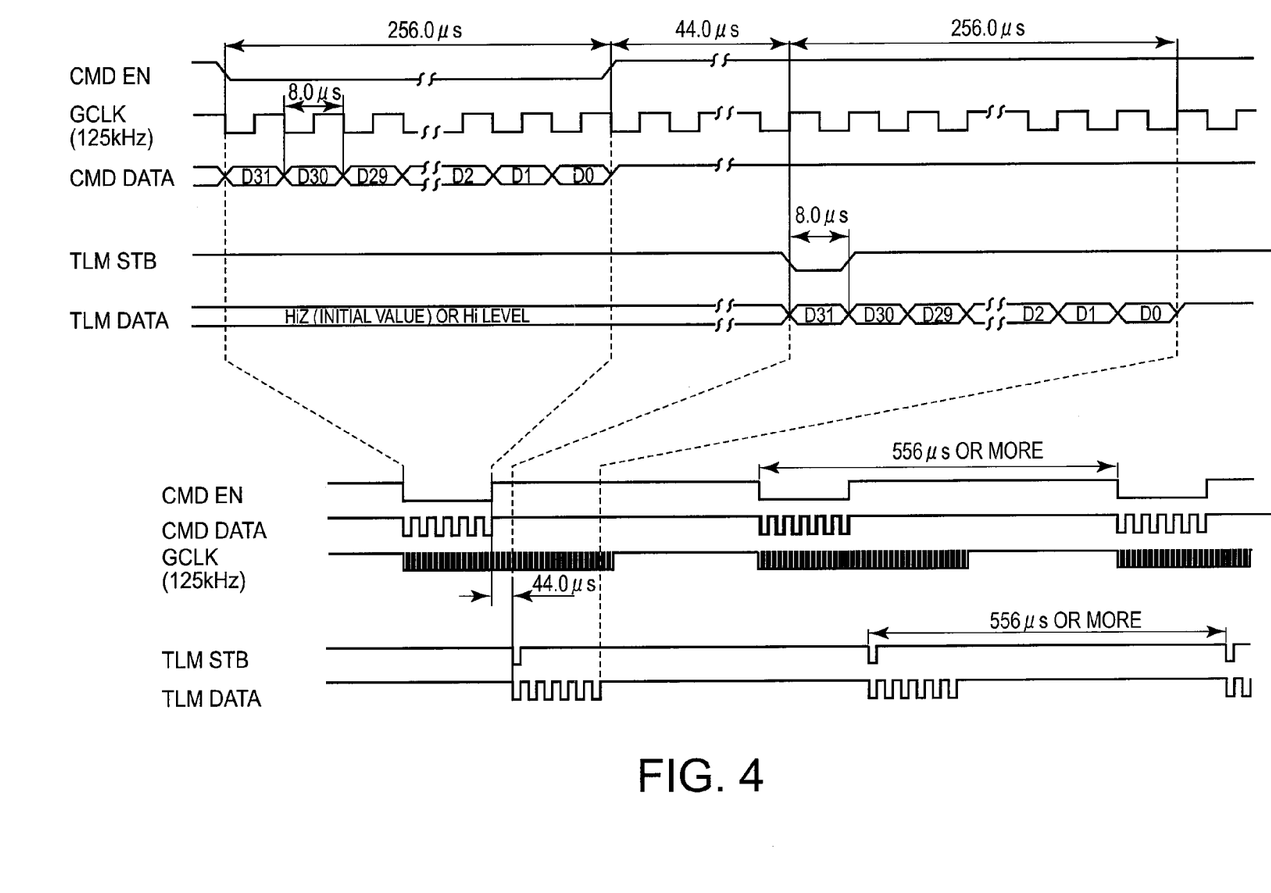
FIG. 4 is a timing chart of signals which are input/output in a control circuit (a serial interface) used in the driving circuit illustrated in FIG. 1.

FIG. 4 is a timing chart of signals which are input/output in the control circuit (the command decoder) 30.

In the example being illustrated, the clock signal GCLK has a clock frequency of 125 kHz in the manner depicted along a second line from a top in FIG. 4. The serial command CMD DATA comprises serial data of 32 bits consisting of D0 to D31 in the manner depicted along a third line from the top. Therefore, the data length signal CMD EN is a signal of a logic L level during of 256.0 μs in the manner depicted along a first or top line in FIG. 4. The data length signal CMD EN has a period which is equal to 556 μs or more in the manner depicted along a sixth line from the top.

The control circuit (the command decoder) 30 produces the telemetry strobe signal TLM STB and the telemetry data TLM DATA at a time instant after a lapse of 44.0 μs from a time instant at which a reading-out of the serial data CMD DADA reaches completion in the manner depicted along third and fourth lines from the top. The telemetry strobe signal TLM STB has also a period which is equal to 556 μs or more in the manner depicted along a ninth line from the top.

As shown in FIG. 1, the control circuit (the command decoder) 30 has four ID terminals ID1, ID2, ID3, and ID4 for identifying the driving device (the analog ASIC) 10 in question. Accordingly, if the number of the channels is lacking in one driving device (analog ASIC) 10, it is possible to simultaneously use a plurality of driving devices (analog ASICs).

Now, the description will proceed to operation in a case of changing the CCD driving capability in the first driving circuit 20-1 in the driving device 10.

It will be assumed that each of the first through the eighth positive selection signals CH1D0 to CH1D7 and the first through the eighth negative selection signals CH1D0L to CH1D7L, which are sent from the control circuit (the command decoder) 30 to the first driving circuit 20-1, is represented by eight bits of "xxxxxxxx" from the least significant bit (LSB) to the most significant bit (MSB). It will be presumed that the LSB in the eight bits indicates the first positive selection signal CH1D0 and the first negative selection signal CH1H0L while the MSB in the eight bits indicates the eighth positive selection signal CH1D7 and the eighth negative selection signal CH1D7L.

First, it will be assumed that the first through the eighth positive selection signals CH1D0 to CH1D7 indicate "00000000" while the first through the eighth negative selection signals CH1D0L to CH1D7L also indicate "00000000". In this event, all of the first through the eighth selective operation NAND gates 251P to 258P and the first through the eighth selective operation AND gates 251N to 258N are tuned off. Therefore, all of the first through the eighth selective operation driving portions 221 to 228 are not driven and only the continuous operation driving potion 210 is driven. Accordingly, the parallel number of the CMOSFETs for driving the CCD in the first driving circuit 20-1 is equal to 10.

Next, it will be assumed that the first through the eighth positive selection signals CH1D0 to CH1D7 indicate "00000001" while the first through the eighth negative selection signals CH1D0L to CH1D7L also indicate "00000001". In this event, only the first selective operation NAND gate 251P and the first selective operation AND gate 251N are turned on while the second through the eighth selective operation NAND gates 252P to 258P and the second through the eighth selective operation AND gates 252N to 258N are tuned off. As a result, the first selective operation driving portion 221 and the continuous operation driving potion 210 are driven while the second through the eighth selective operation driving portions 222 to 228 are not driven. Accordingly, the parallel number of the CMOSFETs for driving the CCD in the first driving circuit 20-1 is equal to 20.

Next, it will be assumed that the first through the eighth positive selection signals CH1D0 to CH1D7 indicate "00000010" while the first through the eighth negative selection signals CH1D0L to CH1D7L also indicate "00000010". In this event, only the second selective operation NAND gate 252P and the second selective operation AND gate 252N are turned on. As a result, the second selective operation driving portion 222 and the continuous operation driving potion 210 are driven. Accordingly, the parallel number of the CMOSFETs for driving the CCD in the first driving circuit 20-1 is equal to 30.

Next, it will be assumed that the first through the eighth positive selection signals CH1D0 to CH1D7 indicate "00000011" while the first through the eighth negative selection signals CH1D0L to CH1D7L also indicate "00000011". In this event, only the first and the second selective operation NAND gates 251P and 252P and the first and the second selective operation AND gates 251N and 252N are turned on. As a result, the first and the second selective operation driving portions 221 and 222 and the continuous operation driving potion 210 are driven. Accordingly, the parallel number of the CMOSFETs for driving the CCD in the first driving circuit 20-1 is equal to 40.

Next, it will be assumed that the first through the eighth positive selection signals CH1D0 to CH1D7 indicate "00000100" while the first through the eighth negative selection signals CH1D0L to CH1D7L also indicate "00000100". In this event, only the third selective operation NAND gate 253P and the third selective operation AND gate 253N are turned on. As a result, the third selective operation driving portion 223 and the continuous operation driving potion 210 are driven. Accordingly, the parallel number of the CMOSFETs for driving the CCD in the first driving circuit 20-1 is equal to 50.

Next, it will be assumed that the first through the eighth positive selection signals CH1D0 to CH1D7 indicate "00001000" while the first through the eighth negative selection signals CH1D0L to CH1D7L also indicate "00001000". In this event, only the fourth selective operation NAND gate 254P and the fourth selective operation AND gate 254N are turned on. As a result, the fourth selective operation driving portion 224 and the continuous operation driving potion 210 are driven. Accordingly, the parallel number of the CMOSFETs for driving the CCD in the first driving circuit 20-1 is equal to 90.

Next, it will be assumed that the first through the eighth positive selection signals CH1D0 to CH1D7 indicate "00010000" while the first through the eighth negative selection signals CH1D0L to CH1D7L also indicate "00010000". In this event, only the fifth selective operation NAND gate 255P and the fifth selective operation AND gate 255N are turned on. As a result, the fifth selective operation driving portion 225 and the continuous operation driving potion 210 are driven. Accordingly, the parallel number of the CMOSFETs for driving the CCD in the first driving circuit 20-1 is equal to 170.

Next, it will be assumed that the first through the eighth positive selection signals CH1D0 to CH1D7 indicate "00100000" while the first through the eighth negative selection signals CH1D0L to CH1D7L also indicate "00100000". In this event, only the sixth selective operation NAND gate 256P and the sixth selective operation AND gate 256N are turned on. As a result, the sixth selective operation driving portion 226 and the continuous operation driving potion 210 are driven. Accordingly, the parallel number of the CMOSFETs for driving the CCD in the first driving circuit 20-1 is equal to 330.

Next, it will be assumed that the first through the eighth positive selection signals CH1D0 to CH1D7 indicate "01000000" while the first through the eighth negative selection signals CH1D0L to CH1D7L also indicate "01000000". In this event, only the seventh selective operation NAND gate 257P and the seventh selective operation AND gate 257N are turned on. As a result, the seventh selective operation driving portion 227 and the continuous operation driving potion 210 are driven. Accordingly, the parallel number of the CMOSFETs for driving the CCD in the first driving circuit 20-1 is equal to 650.

Next, it will be assumed that the first through the eighth positive selection signals CH1D0 to CH1D7 indicate "10000000" while the first through the eighth negative selection signals CH1D0L to CH1D7L also indicate "10000000". In this event, only the eighth selective operation NAND gate 258P and the eighth selective operation AND gate 258N are turned on. As a result, the eighth selective operation driving portion 228 and the continuous operation driving potion 210 are driven. Accordingly, the parallel number of the CMOSFETs for driving the CCD in the first driving circuit 20-1 is equal to 1290.

Lastly, it will be assumed that the first through the eighth positive selection signals CH1D0 to CH1D7 indicate "11111111" while the first through the eighth negative selection signals CH1D0L to CH1D7L also indicate "11111111". In this event, only all of the first through the eighth selective operation NAND gates 251P to 258P and the first through the eighth selective operation AND gates 251N to 258N are turned on. As a result, all of the first through the eighth selective operation driving portions 221 to 228 and the continuous operation driving potion 210 are driven. Accordingly, the parallel number of the CMOSFETs for driving the CCD in the first driving circuit 20-1 is equal to 2560.

In the manner which is described above, it is possible to change the parallel number of the CMOSFETs for driving the CCD in the first driving circuit 20-1 by unit of the predetermined number (10). By changing the parallel number of the CMOSFETs for driving the CCD, the first driving circuit 20-1 has variable output impedance. As a result, it is possible to freely change raise and fall times of the driving signal for driving the CCD serving as a capacitive load.

Now, the description will proceed to effects of the driving device 10 according to the first exemplary embodiment of the present invention.

A first effect is that it is possible to easily change the parallel number of the FETs to be driven in the driving circuit using a small number of control signals. This is because the driving circuit comprises the first through N-th selective operation driving portions where drains of $(M \times 2^{(n-1)})$ P-channel FETs connected in parallel with each other are connected to drains of $(M \times 2^{(n-1)})$ N-channel FETs connected in parallel with each other and the first through the N-th selective operation driving portions are selectively driven by the control signals.

A second effect is that it is possible to arbitrarily change the parallel number of the FETs to be driven in the driving circuit using the small number of control signals with a unit of the predetermined number. This is because each of the first through the N-th selective operation driving portions comprises the complementary FETs which are equal in number to the number obtained by multiplying the predetermined number M by the number obtained by raising two to the (n−1)-th power.

A third effect is that it is possible to change the driving capability of the solid-state image pickup device (the CCD) (the raise and fall times of the driving signal) using the external command (the serial command).

A fourth effect is that it is possible to change the output voltage although the driving signal levels of the output are different from every CCDs. This is because it is possible to change the output voltage of the driving signal in a predetermined range (e.g. a range between +10V and −10V) by changing the power supply voltages (the first and the second power supply voltages) supplied from the external.

A fifth effect is that it is possible to simultaneously use a plurality of driving devices (analog ASICs). This is because the control circuit (the command decoder) is provided with the ID terminals for identifying the analog ASIC in question in a case where the driving device is configured with the analog ASICs.

A sixth effect is that minute control can be made. This is because the plurality of FETs each having a small driving capability are connected in parallel with each other.

A seventh effect is that it is possible to support changing of configuration of the driving capability. This is because it is possible to support although there is some changing of configuration because configuration of the driving capability is carried out by the external command (the serial command).

An eighth effect is that it is possible to supply optimal timing signals matched to the individual CCD. This is because all of the timing signals for driving the CCD are supplied from a different circuit.

Second Exemplary Embodiment

Figure 5:
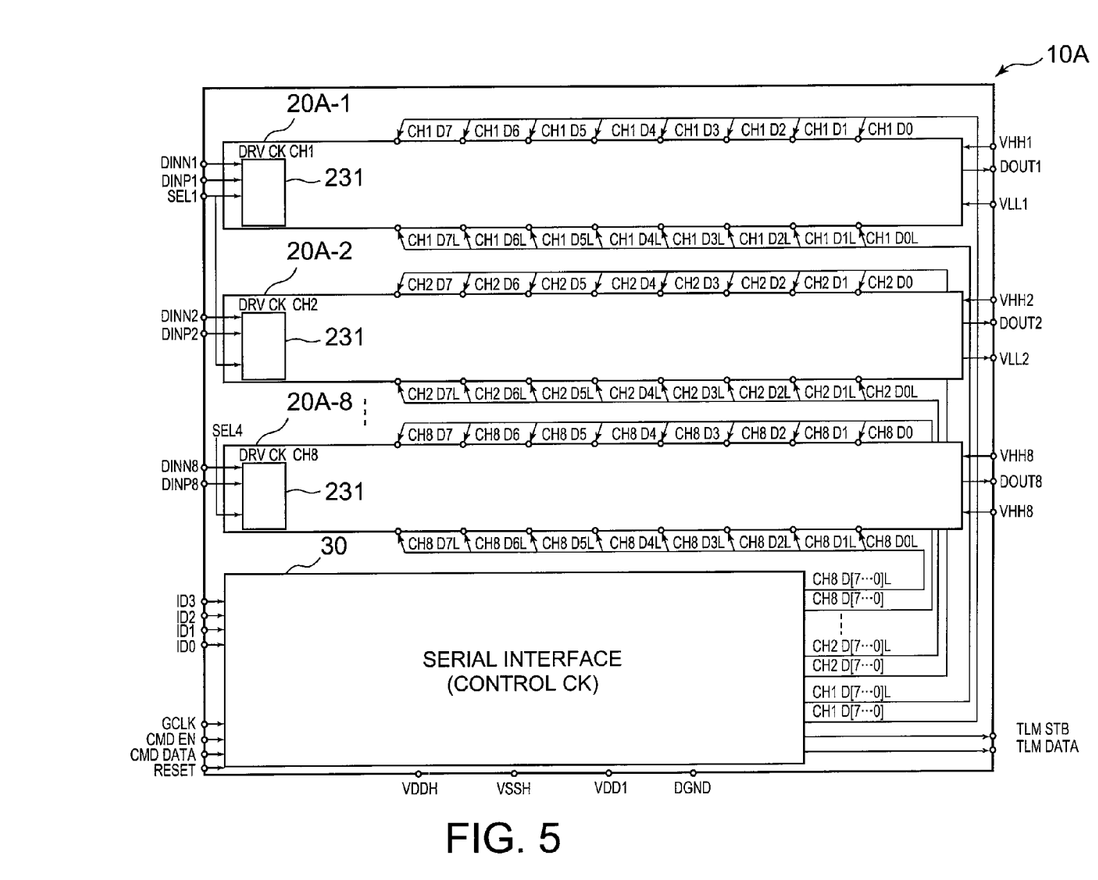
FIG. 5 is a block diagram showing a driving device for a solid-state image pickup device according to a second exemplary embodiment of this invention.

FIG. 5 is a block diagram showing a driving device 10A for a solid-state image pickup device according to a second exemplary embodiment of this invention. Although the solid-state image pickup device comprises a CCD in the example being illustrated, the solid-state image pickup device may not be limited thereto. Hereinafter, the driving device 10A for the solid-state image pickup device will be merely called a "driving device".

The illustrated driving device 10A is similar in structure and operation to the driving device 10 illustrated in FIG. 1 except that the first through the eighth driving circuits are modified from those illustrated in FIG. 1 as will later become clear. The first through the eighth driving circuits are therefore depicted at 20A-1, 20-A-2, . . . , and 20A-8, respectively. Components having functions similar to those of the components shown in FIG. 1 are given the same reference signs. Detailed explanations are made solely about the differences for simplification of explanation.

The first through the eighth driving circuits 20A-1 to 20A-8 are similar in structure to each other. Accordingly, hereinafter, the description will be made mainly about the first driving circuit 20A-1 in details.

Figure 6:
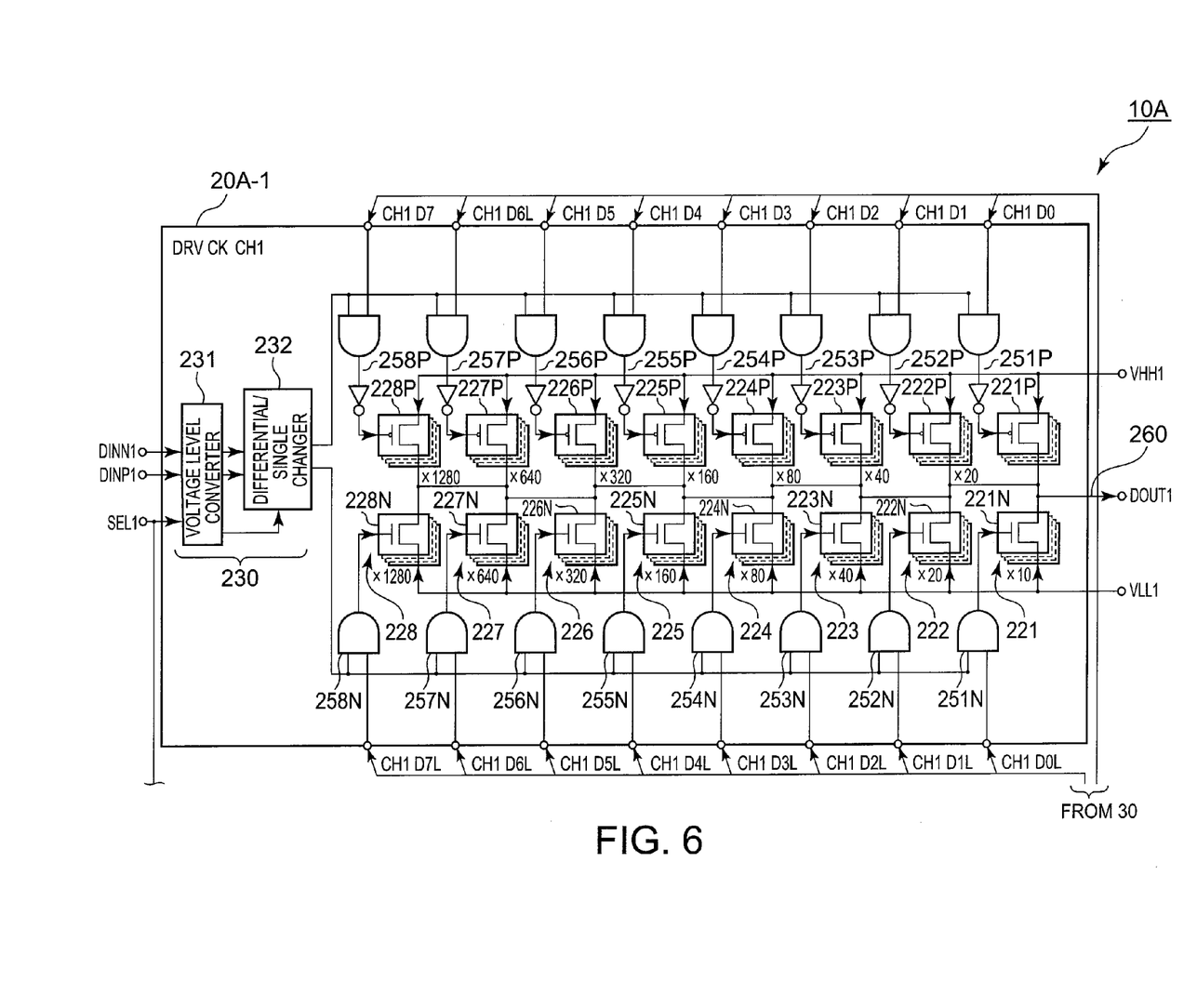
FIG. 6 is a circuit diagram showing a first driving circuit for use in the driving circuit illustrated in FIG. 5.

FIG. 6 is a circuit diagram showing an internal configuration of the first driving circuit 20A-1 in details. The illustrated first driving circuit 20A-1 is similar in structure and operation to the first driving circuit 20-1 illustrated in FIG. 2 except that the continuous operation driving portion 210 and the operation circuit (240P, 240N) are omitted from the first driving circuit 20-1. That is, the first driving circuit 20A-1 comprises the logic level generation circuit 230, the first through the eighth selective operation driving portions 221 to 228, the first through the eighth selection circuit portions (251P, 251N) to (258P, 258N), and the supplying arrangement 260.

Inasmuch as operation of the first driving circuit 20A-1 is similar to that of the first driving circuit 20-1, the description thereof will be omitted.

In addition, inasmuch as effects of the driving device 10A according to the second exemplary embodiment of the present invention are similar to those of the driving device 10 according to the first exemplary embodiment of the present invention, the description thereof will be omitted.

While the invention has been particularly shown and described with reference to exemplary embodiments thereof, the invention is not limited to these embodiments. It will be understood by those of ordinary skilled in the art that various changes in form and details may be made therein without departing from the sprit and scope of the present invention as defined by the claims. For example, although the driving device is configured with the analog ASIC in the above-mentioned exemplary embodiments, the driving device may be configured with discrete transistors. The field effect transistors (FETs) are also not limited to the MOSTETs, other FETs may be used. Furthermore, in place of the MOSFETs, a CCD driving IC having a constant driving capability may be used.

INDUSTRIAL APPLICABILITY

This invention can be applicable to a driving device for a CCD mounted in a satellite in which miniaturization, weight reduction, and low power consumption are required.

What is claimed is:

1. A driving device driving a solid-state image pickup device, comprising:
at least one driving circuit; and
a control circuit producing a control signal to control said driving circuit,
wherein said driving circuit comprises:
first through N-th selective operation driving portions selectively producing first through N-th selective operation driving signals, where N represents an integer which is not less than two, an n-th selective operation driving portion including $(M \times 2^{(n-1)})$ P-channel FETs connected in parallel with each other and $(M \times 2^{(n-1)})$ N-channel FETs connected in parallel with each other, where M represents an integer which is not less than one and n represents each of 1 through N, said $(M \times 2^{(n-1)})$ P-channel FETs having drains connected to drains of said $(M \times 2^{(n-1)})$ N-channel FETs;
a selection circuit selectively driving said first through N-th selective operation driving portions in response to an input signal and the control signal; and
a supplying arrangement combining the first through the N-th selective operation driving signal to supply a combined driving signal to said solid-state image pickup device.

2. The driving device as claimed in claim 1, wherein said control circuit comprises a command decoder producing, in response to an external command, as the control signal, first through N-th selection signals for selectively operating said first through N-th selective operation driving portions, respectively.

3. The driving device as claimed in claim 2,
wherein said driving device receives, as the input signal, a pair of opposite phase input signals having opposite phases with each other,
wherein respective P-channel FETs constituting said first through N-th selective operation driving portions have sources which are supplied with a first power supply voltage,
wherein respective N-channel FETs constituting said first through said N-th selective operation driving portions have sources which are supplied with a second power supply voltage lower than the first power supply voltage,
wherein said driving circuit comprises a logic level generation circuit generating first and second logic input signals having inverse logic levels each other on the basis of the pair of opposite phase signals.

4. The driving device as claimed in claim 3, wherein said selection circuit comprises first through N-th selection circuit portions selectively driving said first through said N-th selective operation driving portions in response to the first through the N-th selection signals, respectively.

5. The driving device as claimed in claim 4,
wherein said command decoder produces, as the first through the N-th selection signals, first through N-th positive selection signals and first through N-th negative selection signals having reverse polarity with each other in order to select said first through said N-th selective operation driving portions, respectively,
wherein an n-th selection circuit portion comprises:
an n-th selection operation NAND gate NANDing the first logic input signal and an n-th positive selection signal to supply an n-th selection operation NANDed result to gates of said $(M \times 2^{(n-1)})$ P-channel FETs; and
an n-th selection operation AND gate ANDing the second logic input signal and an n-th negative selection signal to supply an n-th selection operation ANDed result to gates of said $(M \times 2^{(n-1)})$ N-channel FETs.

6. A driving device driving a solid-state image pickup device, comprising:
at least one driving circuit; and
a control circuit producing a control signal to control said driving circuit,
wherein said driving circuit comprises:
a continuous operation driving portion continuously producing a continuous operation driving signal, said continuous operation driving portion including M P-channel FETs connected in parallel with each other and M N-channel FETs connected in parallel with each other, where M represents an integer which is not less than one, said M P-channel FETs having drains connected to drains of said M N-channel FETs;
an operation circuit continuously operating said continuous operation driving portion in response to an input signal;
first through N-th selective operation driving portions selectively producing first through N-th selective operation driving signals, where N represents an integer which is not less than two, an n-th selective operation driving portion including $(M \times 2^{(n-1)})$ P-channel FETs connected in parallel with each other and $(M \times 2^{(n-1)})$ N-channel FETs connected in parallel with each other, where n represents each of 1 through N, said $(M \times 2^{(n-1)})$ P-channel FETs having drains connected to drains of said $(M \times 2^{(n-1)})$ N-channel FETs;
a selection circuit selectively driving said first through N-th selective operation driving portions in response to the input signal and the control signal; and
a supplying arrangement combining the continuous operation driving signal and the first through the N-th selective operation driving signal to supply a combined driving signal to said solid-state image pickup device.

7. The driving device as claimed in claim 6, wherein said control circuit comprises a command decoder producing, in response to an external command, as the control signal, first through N-th selection signals for selectively operating said first through N-th selective operation driving portions, respectively.

8. The driving device as claimed in claim 7,
wherein said driving device receives, as the input signal, a pair of opposite phase input signals having opposite phases with each other,
wherein respective P-channel FETs constituting said first through said N-th selective operation driving portions have sources which are supplied with a first power supply voltage,
wherein respective N-channel FETs constituting said first through said N-th selective operation driving portions have sources which are supplied with a second power supply voltage lower than the first power supply voltage,
wherein said driving circuit comprises a logic level generation circuit generating first and second logic input signals having inverse logic levels each other on the basis of the pair of opposite phase signals.

9. The driving device as claimed in claim 8, wherein said operation circuit supplies, in response to the first and second logic input signals, said continuously operation driving portion with a signal for causing said continuously operation driving portion to continuously operate.

10. The driving device as claimed in claim 9, wherein said operation circuit comprises:

a continuous operation NAND gate NANDing the first logic level input signals to supply a continuous operation NANDed result to gates of said M P-channel FETs; and
a continuous operation AND gate ANDing the second logic level input signals to supply a continuous operation ANDed result to gates of said M N-channel FETs.

11. The driving device as claimed in claim 8, wherein said selection circuit comprises first through N-th selection circuit portions selectively driving said first through said N-th selective operation driving portions in response to the first through the N-th selection signals, respectively.

12. The driving device as claimed in claim 11,
wherein said command decoder produces, as the first through the N-th selection signals, first through N-th positive selection signals and first through N-th negative selection signals having reverse polarity with each other in order to select said first through said N-th selective operation driving portions, respectively,
wherein an n-th selection circuit portion comprises:
an n-th selection operation NAND gate NANDing the first logic input signal and an n-th positive selection signal to supply an n-th selection operation NANDed result to gates of said $(M \times 2^{(n-1)})$ P-channel FETs; and
an n-th selection operation AND gate ANDing the second logic input signal and an n-th negative selection signal to supply an n-th selection operation ANDed result to gates of said $(M \times 2^{(n-1)})$ N-channel FETs.

* * * * *